Figure 1:
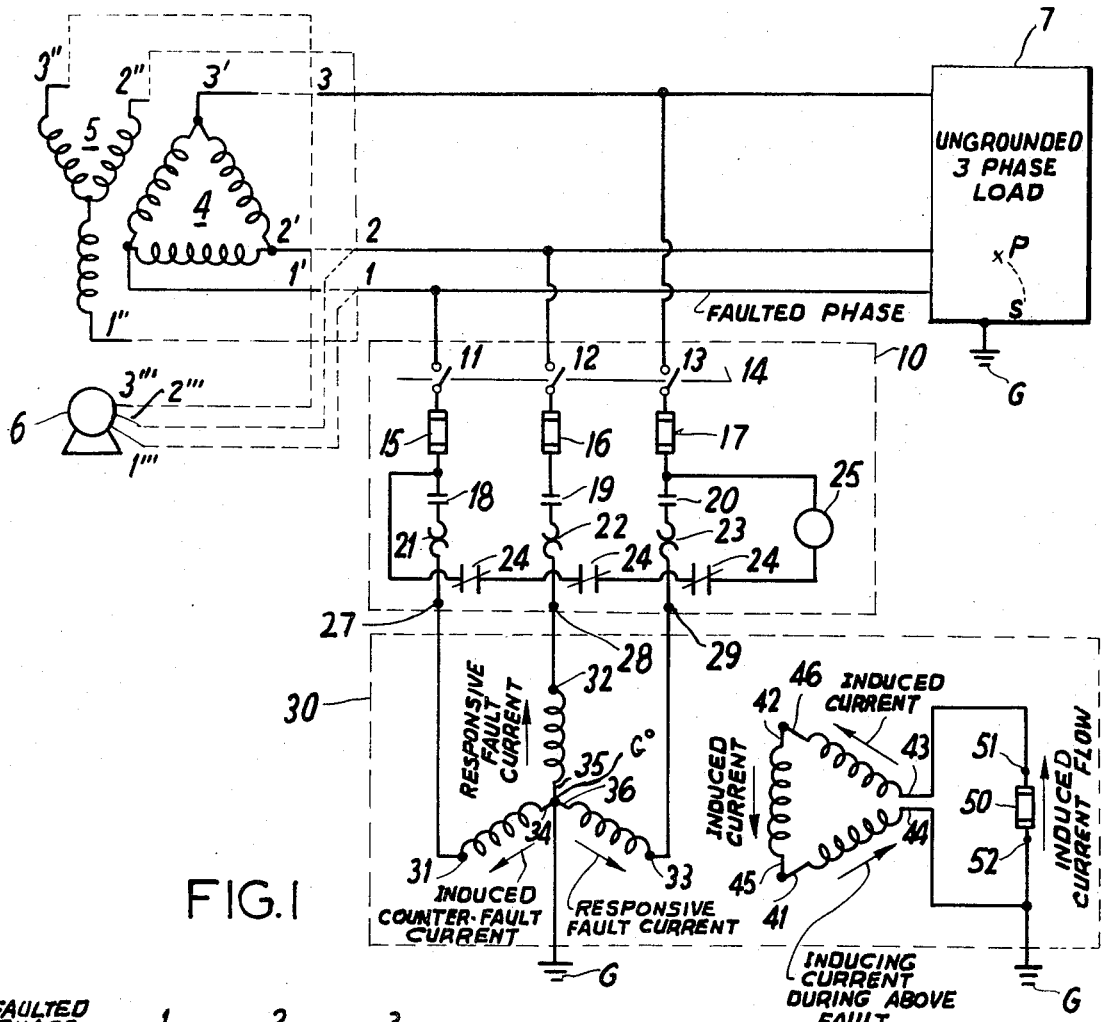

United States Patent [19]
Beachley

[11] 3,764,855
[45] Oct. 9, 1973

[54] ZERO-GROUND FAULT-CUTOUT DESENSITIZING DEVICE

[76] Inventor: Robert W. Beachley, P. O. Box 11281, Charlotte, N.C. 28209

[22] Filed: July 3, 1972

[21] Appl. No.: 268,651

Related U.S. Application Data

[63] Continuation-in-part of Ser. No. 118,700, Feb. 25, 1971, Pat. No. 3,678,338.

[52] U.S. Cl. ............... 317/18 R, 317/40 A, 317/46, 340/255
[51] Int. Cl. ............................................. H02h 7/26
[58] Field of Search ................. 317/46, 18 R, 40 A; 340/255

[56] References Cited
UNITED STATES PATENTS

| | | | |
|---|---|---|---|
| 3,343,080 | 9/1967 | Fox | 317/18 R |
| 1,731,971 | 10/1929 | Courtin et al. | 317/18 R |

Primary Examiner—James D. Trammell
Attorney—LaForest S. Saulsbury et al.

[57] ABSTRACT

A device utilizable with any circuit breaking, or fuse-containing, or alarm-embodying circuit for in-effect delaying and neutralizing the effect of an activation signal which normally would burn out the fuse or break the circuit by activating the circuit breaker or set off the alarm, the primary present embodiment being intended for and utilized with a multi-phase circuit having fuses and/or circuit breakers in each of the leads to the respective multiple phases connected respectively through a plurality of corresponding zero-ground primary coils arranged for magnetic current induction to and from secondary coils connected in series in closed circuit with a fuse or circuit breaker of a predetermined circuit-breaking setting for a fault current of a magnitude less than that necessary for the breaking of circuits of any one or more of the fuses to the respective leads of the primary coils, the secondary coils being arranged relative to the primary coils such that current flow from the zero point into the respective primary leads is induceable of current flow in series through said series of secondary coils and such that current flow through any one or more of the secondary coils in series is induceable of current flow in the primary coils from the zero point toward respective phase leads, thereby a faulted lead being offset by current being induced in its respective coils as a result of the still functioning primary coils inducing current into the series of secondary coils which in turn induce a current into the faulted primary coils.

10 Claims, 2 Drawing Figures

PATENTED OCT 9 1973 3,764,855

ZERO-GROUND FAULT-CUTOUT DESENSITIZING DEVICE

Accordingly, the device of this invention is particularly useful with and this application accordingly is a continuation-in-part of the U.S. Ser. No. 118,700 filed Feb. 25, 1971 now U.S. Pat. No. 3,678,338.

This invention relates to a device for delaying or avoiding fault-circuit-breakages or premature burning out of fuses in circuits embodying zero-ground-connected windings of multi-phase systems.

Prior to the present invention there has existed various electrical circuits either connected or connectable of multi-phase circuits thereof in a zero-ground arrangement, whether of the grounded or the ungrounded type. In particular, however, transformers whether of the zig-zag or of the WYE-DELTA or of the T-connected type have been used to make permanent system conversion from the characteristics of an ungrounded system to that of a grounded system. Also, such transformers, mainly of the zig-zag type have been used to provide a means to establish a ground fault current return path to make ground fault protective devices applicable to ungrounded systems, such as in the parent application of which this application is a continuation-in-part, for example. There was absent however the provisions of any means to permit a user to change the detection value of a ground fault current that would trigger the device and there is an absence of any provisions for the grounding means to provide operating power to operate warning and control devices when a ground fault existed on the system being monitored, particularly where the ground fault was not yet of a serious magnitude or might be a ground fault of a self-correctable nature. More particularly, prior to the present invention, there has not existed any means for imparting a counter-flow current and/or voltage to actually at least partially neutralize or reduce the intensity of the fault-current flow.

SUMMARY OF THE INVENTION

An object of the present invention is to overcome one or more of the difficulties and to accomplish one or more of the desired ends, of the type discussed above.

Another object is to obtain a device for in effect desensitizing cut-out circuits of a zero-ground type for signals such as fault currents of a magnitude below a predetermined amount.

Another object is to obtain a device providing a grounding means for ungrounded A.C. distribution systems that will be automatically ineffective and/or disconnected from the system being monitored at values of fault current adjustable by the user.

Another object is to obtain a device capable of limiting the size of the grounding means to a minimal physical size and expense compatible with the ground fault detection equipment being used.

Another object is to provide a device embodying automatically disconnectable means which will completely disconnect the grounding means from the supply circuit in the event of extreme fault that might otherwise be destructive of the system and the equipment.

Another object is to provide a device embodying a grounding means which will limit system over voltages resulting from arcing faults and other causes.

Another object is to provide a device embodying a grounding means of such capacity that will permit operation of down stream ground fault detection means before the grounding means itself might become automatically disconnected due to extreme ground fault on the system.

Another object is a device providable of circuitry within the grounding means that will permit attachment of audible and/or visual signalling devices powered entirely from the grounding means.

Another object is to make this self-generated power available for remote connection of signal and metering devices.

Other objects become apparent from the preceding and following disclosure.

One or more of the objects are obtained by the invention as defined herein.

Broadly the invention includes a set of primary and secondary coils positioned relative to one another such that current in any one of the coils of the primary system are induceable into a respective matched set of coils of the secondary coils or that a current is induceable from the respective sets of secondary coils into the corresponding sets of primary coils, as the case may be. The primary coils are a plurality of at least two, preferably three zero-ground connected separate coils adaptable to multiple phases of a multiple phase electrical system. The plurality of secondary coils are connected in series with one another and arranged relative to the corresponding matched primary coils such that current flowing from the zero ground into the lead of any one of the multiple phases as a result of a fault in that particular one phase, is at least partially offsettable by an induced counter-current induced into the faulted primary coil by virtue of current flow through a matched secondary coil receiving current in series in a closed circuit of the series of secondary coils which secondary coils current is induced by the still functioning non-faulted primary coils. The current flow in the non-faulted primary coils flows as a result of end in response to the faulted one of the primary coils. The serially connected secondary coils of the present invention differs from conventional prior art systems — which had no contemplation of the present invention, in that the serially connected plurality of secondary coils are connected in series in closed circuit with a fuse or circuit breaker. The secondary coils series circuit breaker or fuse may be selected or adjustably set at a circuit-breaking predetermined point as might be desired, at a value less than the faulting current which would in the particular system normally break the circuit of the circuit breaker or fuse in the lead of the faulted primary coils. Accordingly, by virtue of the secondary plurality of coils being connected in closed circuit and with the fuse in series in the circuit, the serially connected plurality of secondary coils tends to induce a corrective current offsetting the fault current in the faulted primary coil to thereby reduce the effective fault current flowing through the fuse and/or circuit breaker of the lead of the faulted primary-coil circuit. In a preferred embodiment there is connected in series with the fuse in the closed circuit of the serially connected secondary coils, one or more alarms for alarming personnel of the existence of a potential serious fault and of a potential disconnection of a faulted phase. In another preferred embodiment, a time-delay shunt device is connectable in parallel with the serially connected plurality of secondary coils fuse such that the potential across the fuse activates the shunt device to break the circuits of the respective leads of the separate phases of the primary coils for a predetermined period of time after which automatically the broken circuits are re-established, and after the re-established circuits the fuses and/or circuit breakers proceed to function if a severe fault still exists.

Although the invention is illustrated with regard to a WYE-DELTA three phase transformer, the same effect could be obtained by connection of three single phase transformers in WYE-DELTA banks or by a special zig-zag transformer with a third winding per phase not connected to the primary windings but connected in DELTA as disclosed here.

For purposes of the embodiments disclosed herein, in general the invention involves the connection of a WYE-DELTA transformer to an ungrounded distribution system, with the secondary DELTA closed through a fuse. In general, such a transformer having its neutral point grounded will react as follows: A. With no ground fault on the system to which it is connected there will be no current flowing in the neutral connection, and power consumption is practically zero since only transformer charging current will flow. B. If any phase wire of the system becomes grounded accidently, the current flowing through this accidental ground will return to the energy source through the neutral connection of the grounding means. C. Such returning ground current will seek the ungrounded phases and tend to collapse the magnetic field of the grounded phase of the grounding means primary coils. This action will cause reaction in the secondary, producing a circulating current which will tend to reestablish the magnetic flux in the affected phase primary winding within the grounding means. D. Until the automatic disconnect means is caused to operate due to excessive current, all primary windings will carry the same value of current and all secondary windings will carry the same value of current (amount of current determined by winding turn ration). E. In my invention, a fuse in the secondary (DELTA winding) will interrupt this current flow due to a ground fault condition at a selected value of ground fault current. F. Once the fuse in the secondary has blow, the primary windings then become just three inductive loads connected to the source. If the ground fault has persisted, one phase will be grounded and the other two phases will be at full phase-to-phase voltage between each other and from each to ground. Continued operation of electrical machinery served by the distribution system can continue without circuit interruption until maintenance personnel have corrected the ground fault — and replacing the secondary fuse, once again putting the grounding means in condition to detect the next ground fault condition. G. The value of ground fault current at which the invention triggers signals is determined by the size of the fuse in the DELTA secondary winding.

Typically one or more of the above stated objects are accomplished as follows.

1. The grounding means for an ungrounded system is accomplished as described in the preceding paragraph.
2. The grounding means will be of minimum physical size and expense since it need not be of electrical size to carry any large ground fault current that the system could supply. Fusing and/or circuit breakers in both the primary and secondary connections will make the grounding means; first inoperative and not load carrying by opening the DELTA connection, and second in the event of a very severe ground fault will disconnect the grounding means completely from the system. The grounding means need only be large enough and of such electrical capacity to take care of two values of current. First; system charging current which may be of the maximum order of one ampere per thousant KVA of system capacity, and second, continue to carry such value of ground fault current that may be necessary to operate downstream ground fault detection devices (normally not exceeding 5 amperes). Thus a grounding means need not exceed a rating of 2 ampere per phase, continuous, per thousand KVA of the system it is monitoring and in practice may be rated lower depending chiefly on the characteristics of the ground fault detectors downstream.
3. The grounding means is connected to the circuit through standard disconnect means with fuse or circuit breaker (with or without thermal overload contractor) to completely disconnect the grounding means. This disconnect means should be of such size as to protect the grounding means and its connection from destruction in the event of extreme overload. Fuse or circuit breaker size will have to be sized as directed by electrical inspection authorities.

The first overload protection of the transformer consists of the fuse in the DELTA connected secondary. This fuse (or circuit breaker) must be sized to the full time rating of the windings and not to a 10 second rating as is normal with non-disconnectable grounding means. It is possible that a ground fault current may flow for considerable time that is just below the operating point of the secondary fuse or circuit breaker.

The grounding means will limit overvoltages due to arcing faults on the system because the grounding means is sized above the system charging current. It is a common fault that ungrounded systems are subject to overvoltages, due chiefly to arcing faults working in conjunction with system capacitance to ground. These arcing faults cannot build up voltage on the system until the secondary fuse has blown. By that time the arcing fault may have either burned loose or welded itself to ground. In any event, the grounding means will warn immediately of an excessive ground fault condition and operating personnel will take immediate steps to find and eliminate the ground.

The grounding means is not standard in size. The transformer windings must be sized large enough for the system as before mentioned. Also, the secondary fusing must be selected for the application, but the operating point of the grounding means is adjustable by selection of the size of the secondary fuse. Consider an example: A system supplied by a utility transformer rated 2,500 KVA with the utility secondary delivering 600 volts 60 hertz DELTA ungrounded. Assume ground fault detection devices downstream that have an operating point of 5 to 6 amperes ground fault current. The preferred DELTA secondaries would be 120 volts so as to operate standard voltage signal and control devices. (This is, however, not a limiting condition). The three primary windings must each be rated to the system voltage - 600 volts. The grounding means must be operative at the charging current plus the detection point of downstream detector; that is 2½ ampere plus 6 amperes, or 8½ amperes in the neutral connection in the event of ground fault. However, this current divides equally over the three phases so that the individual coils would be rated 8.5/3 or 2.83 amperes. The secondary coils would be rated 2.83 × 5 or 14.55 ampere (5 being the ratio of primary to secondary turns). The rating of the primary fuses or circuit breaker and thermal overloads would be selected to protect this 2.83 ampere rating and the secondary fuse should not exceed 15 amperes.

Suggested and required circuitry within the grounding means can best be understood by examination of the accompanying drawings wherein:

THE FIGURES

FIG. 1 is a diagram of an ungrounded electrical distribution system with a grounding means with arrangements to first open the secondary of the grounding means in the event of a ground fault of sufficient magnitude and second to completely disconnect the grounding means in the event of severe fault.

Figure 2:
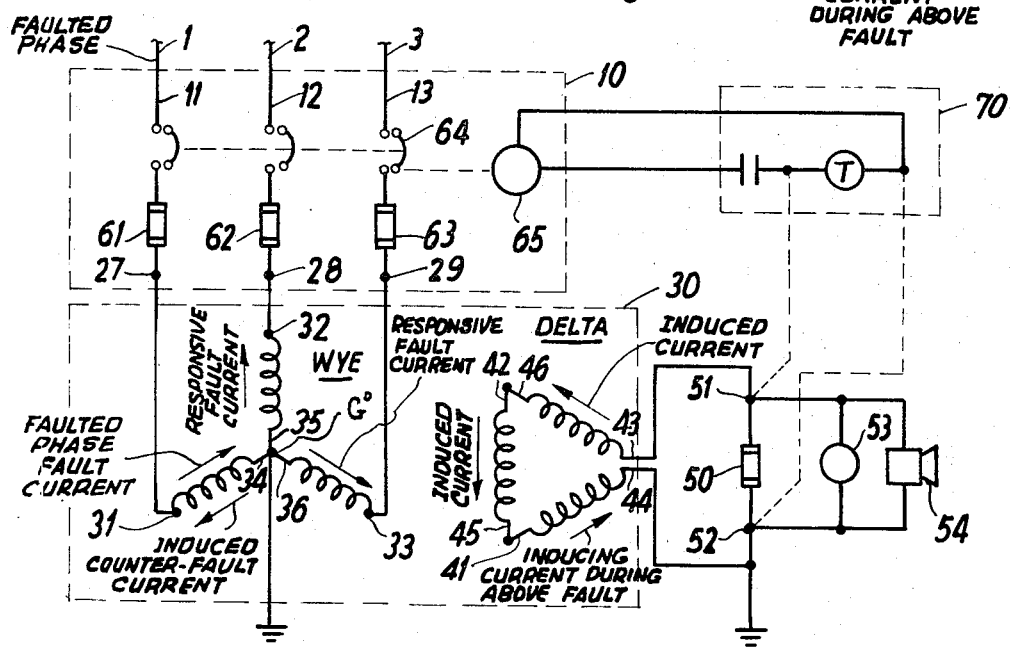

FIG. 2 differs from FIG. 1 in that the complete disconnection of the grounding means is effected at an adjustable time interval after the grounding means has responded to a ground fault of set magnitude and also indicates remote signal devices that also may be used with the arrangement of FIG. 1.

With reference to the above discussion, a relationship may be expressed in the nature of a formula as follows. In the formula the minimum amperage requirement for secondary fuses may be represented by $A_f(MINS)$; and the amperage necessary for charging — i.e., the charging amperage may be represented by $A_c$; and the amperage required for downstream detectors may be represented as $A_d$; and the number of phases may be represented as $N_t$; and the ratio of primary to secondary turns may be represented as $N_R$; and the maximum amperage for which a fuse or circuit breaker is set as a predetermined value may be represented by $A_f(MAXS)$; and $A_t$ may represent the tolerance amperage desirable. Accordingly two representative formulas are as follow:

$$A_f(MINS) = [(A_c + A_d) \div N_t] N_R \quad (1)$$

$$A_f(MAXS) = A_f(MINS) + A_t \quad (2)$$

Under normal circumstances, the tolerance amperage — i.e. $A_t$ is about 0.5 A (amperes).

Referring to FIG. 1, there is shown schematically a three-phase electrical distribution system providing A. C. electrical power in three phase on three phase conductors 1, 2, 3. The source of power may be a transformer 4 DELTA connected, ungrounded; or transformer 5 WYE connected ungrounded; or, generator 6 connected either DELTA ungrounded or WYE ungrounded. Load 7 served from the distribution system may be of any nature commonly supplied from ungrounded distribution systems, i.e., motors, heating units, stepdown transformers and the like. A disconnecting and protecting device 10 is provided to connect the grounding means 30 to the distribution system conductors 1, 2 and 3. Disconnect device 10 (as shown) consists of a three pole fused switch with operating handle 14, disconnect blades 11, 12 and 13, fuses 15, 16 and 17, contacts 18, 19 and 20 which are held closed by operating coil 25. Thermal overloads 21, 22 and 23 furnish heat which if excessive causes a respective contact 24 to open thus breaking the circuit to coil 25. If switch operating handle 14 is closed, blades 11, 12 and 13 will energize the fuses and coil 25 will close contacts 18, 19 and 20 thus passing current from lines 1, 2 and 3 to points 27, 28 and 29 energizing the transformer of grounding means 30. Suitable devices are commercially available as described above for device 10. It is not essential for the proper operation of this invention but it is desirable to use a device 10 which has 'trigger fuses' so designed that if any one fuse blows the blown fuse's trigger will break the control circuit to coil 25 thus completely disconnecting grounding means 30 from the system. A 3-pole circuit breaker may be used in device 10 instead of the fuses provided two conditions are observed. These are: one, that the circuit breaker is of proper capacity to protect grounding means 30 and, second, that the circuit breaker can safely operate and clear the ground fault current that the system may be able to supply. Grounding means 30 consists of a WYE-DELTA transformer with the secondary DELTA unclosed. Phase A primary winding 31–34 is magnetically linked with secondary winding 41–44. Phase B primary winding 32–35 is magnetically linked with secondary winding 42–45. Phase C primary winding 33–36 is magnetically linked with secondary winding 43–46. All primary windings; that is 31–34, 32–35 and 33–36 have the same number of turns, each as each. All secondary windings; that is 41–44, 42–45 and 43–46 have the same number of turns, each as each — but not necessarily the same number of turns as the primary windings. The three primary windings at ends 34, 35 and 36 are connected together and connected to an earth or ground point G. Primary winding ends 31, 32 and 33 are electrically connected to the system phase conductors 1, 2 and 3 through protective device 10. This constitutes the WYE connection of the primary windings of the grounding device 30. The design voltage rating of the primary windings must be that of the distribution system voltage phase-to-phase.

As hereinbefore stated, the preferred voltage rating of secondary winding is 120 volts — although not a limiting condition. The three secondary windings are connected in DELTA. That is: end 41 of phase A is connected to end 45 of phase B and end 42 of phase B is connected to end 46 of phase C. Ends 43 and 44 are not connected together — to do so would create a conventional WYE-DELTA transformer. Ends 43 and 44 are connected to fuse 50 at points 51 and 52. Point 52 is grounded to provide protection to personnel — it does not affect the operation of the grounding means whatsoever.

The description so far describes all of the essentials to provide a reference ground for the operation of ground fault detection devices downstream. Conventional ground fault detection devices will operate downstream with no additional features incorporated into grounding means 30. (My U.S. Pat. No. 3,678,338 provided such a reference ground but lacked the features as described hereinafter.)

With the grounding means 30 connected and no ground fault existing on the distribution system there will be no ground fault current flowing in the zero-ground G° (from G° to 34, 35, 36) and the only current flowing in the transformer will be the very small magnetizing current. The three secondary voltages will be balanced, resulting in zero voltage from ends 43 and 44 and no current flowing through fuse 50. Should a ground condition occur with any device, motor, conductor, etc., which is a part of load 7 say at point P — a ground fault current will flow from point P to point S (the metal of the enclosure) to ground point G' and through building steel, water pipes or the like back to ground connection G of the grounding means seeking a return path to the unfaulted phases. The reaction to a ground fault in load 7 will be similar whichever of the phases has grounded. Assume that phase A has experienced the ground. The ground fault current returning to the transformer will attempt to return to the source of supply through phases B and C and will tend to demagnetize winding 31–34 of phase A. The fault current flowing in phase B (35 to 32) and in phase C (36 to 33) will induce currents in secondary coils 42–45 and 43–46 and these currents vectorially through fuse 50 will cause secondary winding 41–44 to attempt to restore the magnetic flux in primary winding (31–34) phase A. Until the fault current reaches a magnitude sufficient to blow fuse 50, all secondary currents will be of equal magnitude and the currents in the three primary windings will be equal. With the three primary currents of the grounding means 30 equal — it follows that the voltages of the three phase will be equal with respect to ground G. Thus is accomplished stated object No. 4.

It should be noted here that this grounding means of an ungrounded system provides to the normally ungrounded system the characteristics of a solidly grounded system insofar as voltage stability of the system is concerned — that the condition only persists until the ground fault current magnitude has grown to the point of blowing fuse 50. Engineering analysis of the system to which grounding means 30 is to be applied may dictate that a grounding means capable of tolerating a larger ground fault current than necessary to operate downstream detection devices may be advisable to maintain voltage stability. This desirable feature needs evaluation against the necessity to avoid the possibility of normal circuit protective devices putting the affected circuit out of operation. The controlling factor is that ungrounded circuits are normally used because they can continue to serve equipment without interruption with one phase solidly grounded.

If the ground fault current grows in magnitude sufficient to blow fuse 50, the secondary currents cease to circulate, the magnetic flux in phase A collapses and end 31 of phase A primary coil assumes ground potential. The entire distribution system (to which the grounding means 30 is attached) now will operate with one phase grounded until maintenance personnel locates the accidental ground, repairs it, replaces fuse 50, and thus puts the system back in service.

When fuse 50 blows, a voltage will appear at terminal 51–52 equal to the voltage ratio of one secondary coil — if as suggested hereinbefore, it will be 120 volts.

Refer to FIG. 2. Herein is shown a modification of disconnect device 10 and the suggested signal and control devices that may be obtained from terminals 51 and 52 of both FIG. 1 and FIG. 2.

With fuse 50 blown and one phase's magnetic flux collapsed, the voltage at terminals 51 and 52 may be used to light a signal light 53 or sound an audible signal shown as horn 54 which will give audible signal that a ground fault has occurred and that the grounding means 30 is inoperative. The voltages from points 51–52 can be taken remotely to give a signal at any desired location, or used to operate an auxillary device.

A possible modification of the system involves the primary protection, 10. FIG. 1 shows this as fuse or circuit breaker with thermal overload controlled contactor. The elements within primary protection device 10 may be (if the system to which it is applied permit) a shunt trip circuit breaker. If the circuit to which the grounding means 30 is to be applied requires short circuit protection beyond that provided by a circuit breaker — the protective device then would include a circuit breaker 64 and current limiting fuses 61, 62 and 63. FIG. 2 is drawn showing protective device 10 with a circuit breaker 64 with shunt trip 65 and with current limiting fuses 61, 62 and 63. FIG. 2 shows the shunt trip coil 65 of circuit breaker connected to points 51 and 52 through a time delay relay 70 which will permit signals 53 and 54 (and any remote signals which may be connected) to operate for a preset time before becoming automatically discontinued by the activation of the time relay contacts. A shunt trip circuit breaker is a commerically available device and not a part of the invention. In principle it operates as follows: the circuit breaker has normal off-on operating handle — when in the on position it will be tripped automatically in response to electrical overload activating a thermally responsive or magnetically responsive trip element (or both). In addition a shunt trip circuit breaker has a coil within 65, which when energized activates the trip mechanism independent of the otherwise normal trip by electrical overload. The shunt trip coil can be responsive to any desired voltage — in this case the shunt trip coil would be specified as 120 volt 60 hertz. The time delay relay 70 is also a commercially available device which upon application of operating voltage begins a time cycle at the end of which it closes a contact applying the voltage from points 51 and 52 to the operation coil of the shunt trip circuit breaker. As a result the grounding means 30 is completely disconnected from the distribution system being monitored. The time interval of the time delay relay is adjustable by the operating personnel.

Another modification could be used if fuse 50 blows too often. This modification (not shown in the drawings) could be a single pole contactor electrically held closed by a holding coil powered from the primary voltage of device 30 with a thermal overload responsive to the current flowing from points 43–44 in the event of a ground fault current on the distribution system. Excessive current through the thermal overload would interrupt the holding coil circuit and allow the contacts to open and allow voltage to appear at points 51 and 52 as if fuse 50 had blown. The use of such a relay, although more costly at first than a fuse, could avoid the expense of fuse replacement. The use of such a relay is a matter of economics and in no way affects the conception of the patent.

It is within the scope of this invention to make such variations and modifications and substitutions of equivalents as would be apparent to a person of skill in this particular art.

I claim:

1. A fault-cutout desensitizing zero-ground device comprising in combination: a first plurality of primary coils having zero ground, each primary coil of said plurality having a lead connectable to a separate phase; a second plurality of secondary coils connected in series and in closed-circuit cycle with one-another, said secondary coils and said primary coils being arranged relative to one another such that each of said arranged primary coils is induceable of current flow through said secondary and such that each arranged secondary coil is induceable of counter current into a matched-up one of said primary coils, said series including a fuse means of preset maximum current flow flowable before breaking circuit of said series, whereby when respective said leads of said first plurality are operatively connected to a multi-phase circuit a fault below a predetermined magnitude in a circuit of a lead of one of said first plurality results in an induced current into the faulted primary coil from a matched one of said secondary coils until an increased magnitude of current flow in the secondary coils causes said fuse means to break the circuit of said series.

2. A device of claim 1, including a plurality of additional fuse means with each of said plurality of phases leads being operatively in series with one of said additional fuse means, and each of said additional fuse means being present at a circuit-breaking degree of magnitude of current in excess of preset fuse means of said secondary coils such that said secondary coils fuse means is breakable of the circuit of said secondary coils series closed circuit piror to the breaking of circuit by any one of said additional fuse means.

3. A device of claim 2, in which said plurality of primary coils comprises three coils and said plurality of secondary coils comprises three coils.

4. A device of claim 3, in which said primary coils are WYE wound coils and said secondary coils are DELTA wound coils.

5. A device of claim 4, including connected in parallel with said secondary coils fuse means at least one alarm means.

6. A device of claim 5, including a ground connected to the circuit of said secondary coils.

7. A device of claim 1, including connected in parallel with said secondary coils fuse means at least one alarm means.

8. A device of claim 7, including a ground connected to the circuit of said secondary coils.

9. A device of claim 8, including in parallel with said secondary coils fuse means a time delay means connected to break circuits of each of said primary coils leads for a predetermined period of time before closing the broken circuit, in the nature of a shunt, whereby for a false-fault-indication or a correctable fault, said secondary coils fuse means and said time delay means fail to break their respective circuits prior to the shunt-breaking of the lead circuits and the subsequent reclosing of the lead circuits.

10. A device of claim 2, including in parallel with said secondary coils fuse means a time delay means connected to break circuits of each of said primary coils leads for a predetermined period of time before closing the broken circuit, in the nature of a shunt, whereby for a false-fault-indication or a correctable fault, said secondary coils fuse means and said additional fuse means fail to break their respective circuits prior to the shunt-breaking of the lead circuits and the subsequent reclosing of the lead circuits.

* * * * *